(12) United States Patent
Lamontagne

(10) Patent No.: US 8,781,756 B2
(45) Date of Patent: Jul. 15, 2014

(54) METHOD AND SYSTEM FOR ESTIMATING TRANSFORMER REMAINING LIFE

(75) Inventor: Donald R. Lamontagne, Surprise, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 379 days.

(21) Appl. No.: 13/186,140

(22) Filed: Jul. 19, 2011

(65) Prior Publication Data

US 2013/0024131 A1    Jan. 24, 2013

(51) Int. Cl.
*G05B 23/02* (2006.01)

(52) U.S. Cl.
USPC .......................................... 702/24; 702/182

(58) Field of Classification Search
USPC ................. 702/22–24, 27, 182–185; 361/603
See application file for complete search history.

(56) References Cited

U.S. PATENT DOCUMENTS

| | | | |
|---|---|---|---|
| 4,799,166 A | 1/1989 | Shiono et al. | |
| 6,276,222 B1 * | 8/2001 | Miyamoto et al. | 73/866 |
| 6,391,096 B1 | 5/2002 | Waters et al. | |
| 6,446,027 B1 | 9/2002 | O'Keeffe et al. | |
| 6,526,805 B1 | 3/2003 | Babes-Dornea et al. | |
| 6,906,630 B2 | 6/2005 | Georges et al. | |
| 6,928,861 B1 | 8/2005 | Rice | |
| 7,222,518 B2 | 5/2007 | Dohi et al. | |
| 7,647,202 B2 | 1/2010 | Lamontagne | |
| 7,747,417 B2 | 6/2010 | Lamontagne | |
| 2002/0161558 A1 | 10/2002 | Georges et al. | |
| 2006/0259277 A1 * | 11/2006 | Fantana et al. | 702/183 |
| 2007/0070583 A1 * | 3/2007 | Callsen et al. | 361/603 |
| 2009/0043538 A1 * | 2/2009 | Lamontagne | 702/183 |
| 2009/0091867 A1 | 4/2009 | Guzman-Casillas et al. | |

OTHER PUBLICATIONS

Goto et al., Measurement of Winding Temperature of Power Transformers and Diagnosis of Ageing Deterioration by Detection of CO2 and CO, Cigre, Paris, 1990 Session, Doc. 12-102, pp. 1-7.
Yoshida et al., Degradation of Insulating Material of Transformers, IEEE Transactions on Electrical Insulation, Vo. EI-22 No. 6, Dec. 1987, pp. 795-800.
IEEE Guide for Liquid-Immersed Transformer Through-Fault-Current Duration, IEEE Std C57.109-1993, Institute of Electrical and Electronics Engineers, Inc., New York, NY, 1993.

(Continued)

*Primary Examiner* — Manuel L Barbee
(74) *Attorney, Agent, or Firm* — Schmeiser, Olsen & Watts LLP; Lowell W. Gresham; Charlene R. Jacobsen

(57) ABSTRACT

A transformer (26) is monitored by a dissolved gas monitoring device (28). A method (36) in the form of executable code instructs a processor (34) to estimate a remaining life (124) of the transformer. The method includes receiving (126), from the monitoring device (28) data elements (60) representing a current value (134) of dissolved gases (72) in the transformer (26) that correlate with degradation of insulating material in the transformer. Adjustment values (142, 144) are determined for the gases (72) in response to isolated events (160, 162) occurring at the transformer. The current value (134) and the adjustment values (142, 144) are combined to obtain a total value (114), and a degree of polymerization value (116) is estimated using the total value (114). The value (116) is converted into a measure of remaining life (124) of the transformer, and the measure of remaining life (124) is presented to a user (58).

20 Claims, 13 Drawing Sheets

(56) References Cited

OTHER PUBLICATIONS

IEEE Guide for Loading Mineral-Oil-Immersed Transformers, IEEE Std C57.91/1995, Institute of Electrical and Electronics Engineers, Inc., New York, NY, 1996.

IEEE Guide for the Interpretation of Gases Generated in Oil-Immersed Transformers, IEEE Power & Energy Society, IEEE Std C57.104-2008, Institute of Electrical and Electronics Engineers, Inc., New York, NY, Feb. 2009.

Transformer Diagnostics, Facilities Instructions, Standards, and Techniques, vol. 3-31, Jun. 2003, United States Department of the Interior Bureau of Reclamation, Denver, CO.

IEEE Standard for General Requirements for Liquid-Immersed Distribution, Power, and Regulating Transformers, IEEE Std C57.12.00-2010, Sep. 2010, Institute of Electrical and Electronics Engineers, Inc., New York, NY.

V.G. Arakelian, Effective Diagnostics for Oil-Filled Equipment, IEEE Electrical Insulation Magazine, Nov./Dec. 2002.

Cigre TF B3-03-1, Guidelines to an Optimised Approach to the Renewal of Existing Air Insulated Substations, Apr. 2006.

Duval, A Review of Faults Detectable by Gas-in-Oil Analysis in Transformers, IEEE Electrical Insulation Magazine, 2002.

General Electrotechnical Engineering Standards Committee, The Interpretation of the Analysis of Gases in Transformers and Other Oil-filled Electrical Equipment in Service, British Standard BS 5800:1979,.

Yann-Chang Huang, A New Intelligent Approach to Fault Detection of Electric Power Transformers, Department of Electrical Engineering, Cheng Shiu Institute of Technology, Kaohsiung, Taiwan, R.O.C.

D.R. Lamontagne, An Artifical Neural Network Approach to Transformer Dissolved Gas Analysis and Problem Notification at Arizona Public Service, EPRI Substation Equipment Diagnostics Conference XIV, Jul. 2006.

M.K. Pradham and T.S. Ramu, On the Estimation of Elapsed Life of Oil-Immersed Power Transformers, IEEE Transactions on Power Delivery, vol. 20, No. 3, Jul. 2005.

Z. Wang, Artificial Intelligence Applications in the Diagnosis of Power Transformer Incipient Faults, http://scholar.lib.vt.edu/theses/available/etd-08102000-21510032/, Blacksburg, VA, Aug. 8, 2000.

International Search Report and the Written Opinion of PCT/US2012/046926, ISA, Oct. 26, 2012.

\* cited by examiner

FIG. 2

| TRANSFORMER ID | H$_2$ | O$_2$ | CO | CO$_2$ | CH$_4$ | C$_2$H$_2$ | C$_2$H$_4$ | C$_2$H$_6$ |
|---|---|---|---|---|---|---|---|---|
| TA01 | 10 | 750 | 55 | 400 | 25 | 0 | 2 | 10 |

FIG. 3

| TRANSFORMER ID | H$_2$ | O$_2$ | CO | CO$_2$ | CH$_4$ | C$_2$H$_2$ | C$_2$H$_4$ | C$_2$H$_6$ |
|---|---|---|---|---|---|---|---|---|
| TA01 | 35 | 900 | 310 | 1100 | 6 | 0 | 0 | 0 |

FIG. 7

| CONVERT DATA ELEMENTS TO DISSOLVED GASES IN MILLILITERS PER GRAM IN RELATIVE TO VOLUME OF OIL AND WEIGHT OF INSULATING MATERIAL WITHIN TRANSFORMER |
|---|
| $$DG_{CUR} (mL/g) = \frac{\frac{[(CO+CO_2) (ppm)]}{1000} * [X(gal)] * 3.7854 (L/gal)}{[Y(lb)] * 453.59237 (g/lb)}$$ |
| WHERE:<br>   (CO+CO$_2$) = DATA ELEMENTS/VALUES IN PARTS PER MILLION<br>   X = VOLUME OF OIL WITHIN TRANSFORMER<br>   Y = WEIGHT OF INSULATING MATERIAL WITHIN TRANFORMER |

FIG. 8

| ID | DATE/TIME | EVENT | DG$_{MAINT}$ | | DG$_{FLT}$ (ppm) |
|---|---|---|---|---|---|
| | | | CO (ppm) REMOVED | CO$_2$ (ppm) REMOVED | |
| ⋮ | ... | ... | ... | ... | ... |
| TA01 | 3/14/1999 | THROUGH-FAULT | | | 154 |
| TA01 | 11/7/2003 | THROUGH-FAULT | 160 | 148 | 212 |
| TA01 | 12/2/2003 | MAINT | 227 | 923 | |
| TA02 | 6/15/2002 | THROUGH-FAULT | 162 | 148 | 191 |
| ⋮ | ... | ... | ... | ... | ... |

FIG. 9

FIND REMAINING LIFE REMOVED DUE TO THROUGH-FAULT: %RL_FLT

MAX LIFETIME THROUGH-FAULT STRENGTH (K) OF TRANSFORMER:

$$K = I_{MAX}^2 T$$

WHERE: $I_{MAX}^2$ = MAXIMUM FAULT CURRENT
T = 2 SECONDS

---

DETERMINE %RL_FLT AS PERCENTAGE OF MAX LIFETIME THROUGH-FAULT STRENGTH (K) OF TRANSFORMER

CALCULATE MAXIMUM FAULT CURRENT:

$$I_{MAX} = \frac{BASE\ MVA}{\sqrt{3} \times V_{SECONDARY} \times Z_T}$$

WHERE: BASE MVA IS BASE MEGAVOLT AMPERE
$V_{SECONDARY}$ IS SECONDARY VOLTAGE OF TRANSFORMER
$Z_T$ IS TRANSFORMER IMPEDANCE

---

MECHANICAL DAMAGE: $I_{FLT} > I_{MAX}/2$

THEREFORE: $\%RL_{FLT} = \dfrac{I_{FLT}^2 \times T_{FLT}}{I_{MAX}^2 \times 2\ SECONDS}$

WHERE: $I_{FLT}$ IS FAULT CURRENT
$T_{FLT}$ IS FAULT DURATION, SECONDS

---

THERMAL DAMAGE: $I_{FLT} \leq I_{MAX}/2$

THEREFORE: $\%RL_{FLT} = \dfrac{K}{I_{MAX}^2 \times 2\ SECONDS}$

WHERE: K IS DETERMINED FROM TABLE
$I_{FLT\_PU}$ IS FAULT CURRENT EXPRESSED IN TIMES NORMAL BASE CURRENT, AS FOLLOWS:

$$I_{BASE} = \frac{BASE\ MVA}{\sqrt{3} \times V_{SECONDARY} \times Z_T}$$

| $I_{FLT\_PU}$ | $Z_T$ | K |
|---|---|---|
| 4.1 | 12% | 1,650 |
| 4.9 | 10% | 1,320 |
| 6.2 | 8% | 1,230 |
| 7.0 | 7% | 1,275 |
| 8.0 | 6% | 1,150 |
| 9.8 | 5% | 1,250 |
| NA | ≤4% | $I_{FLT}^2 T$ |

FIG. 10

DETERMINE ADJUSTMENT VALUE FOR EQUIVALENT AMOUNT OF DISSOLVED GASES CALCULATED FOR THROUGH-FAULT: $DG_{FLT}$

UNKNOWN:
- $DG_{FLT}$ = EQUIVALENT AMOUNT OF DISSOLVED GASES $(CO + CO_2)$ CALCULATED FOR THROUGH-FAULT

KNOWN:
- $\%RL_{PREV}$ = REMAINING LIFE PRIOR TO FAULT
- $\%RL_{FLT}$ = REMAINING LIFE REMOVED DUE TO FAULT
- $DG_{PREV}$ = DISSOLVED GAS VALUE $(CO + CO_2)$ PRIOR TO FAULT

DEGREE OF POLYMERIZATION ESTIMATE:
$$DP = -214.32 \ln(DG_{TOTAL}) + 444.73$$

PERCENT REMAINING LIFE ESTIMATE:
$$\%RL = 66.547 \ln(DP) - 353.78$$

SET: $DG_{TOTAL} = (DG_{PREV} + DG_{FLT})$
$\%RL = \%RL_{PREV} - \%RL_{FLT}$

THEREFORE:
$$\%RL_{PREV} - \%RL_{FLT} = 66.547 \ln(-214 \ln(DG_{PREV} + DG_{FLT}) + 444.73) - 353.78$$

SOLVE FOR $DG_{FLT}$:
$$DG_{FLT} = e^{\left( \dfrac{e^{\left( \dfrac{(\%RL_{PREV} - \%RL_{FLT}) + 353.78}{66.547} \right)} - 444.73}{-214.32} \right)} - DG_{PREV}$$

FIG. 11

PREDICT DURATION UNTIL END OF LIFE OF TRANSFORMER: ENDLIFE(T) ← 216

UNKNOWN:
- $DG_{FUTURE}$ = ESTIMATE OF A REQUIRED FUTURE TOTAL DISSOLVED GAS VALUE AT TRANSFORMER END OF LIFE (218)
- $ENDLIFE(T)$ = PREDICTED DURATION OF TIME UNTIL TRANSFORMER END OF LIFE (216)

KNOWN:
- $DP = 200$ (116)
- $DG_{PREV}$ = MOST RECENT TOTAL DISSOLVED GAS VALUE ($CO + CO_2$) (220)

DEGREE OF POLYMERIZATION ESTIMATE:
$$DP = -214.32\ln(DG_{TOTAL}) + 444.73 \quad \leftarrow 112$$

SET:
$$DG_{TOTAL} = DG_{FUTURE} - DG_{PREV} \quad \leftarrow 222$$

THEREFORE:
$$200 = -214.32\ln(DG_{FUTURE} - DG_{PREV}) + 444.73 \quad \leftarrow 112$$

SOLVE FOR $DG_{FUTURE}$:
$$DG_{FUTURE} = e^{\left(\frac{444.73 - 200}{214.32}\right)} + DG_{PREV} \quad \leftarrow 224$$

SOLVE FOR ENDLIFE(T):
$$ENDLIFE(T) = \frac{DG_{FUTURE}\ (mL/g)}{RATE_{CO}(ppm/day) + RATE_{CO2}\ (ppm/day)} \quad \leftarrow 230$$

WHERE:
- $RATE_{CO}$ (ppm/day) = GAS GENERATION RATE FOR CO (226)
- $RATE_{CO2}$ (ppm/day) = GAS GENERATION RATE FOR $CO_2$ (228)

| |
|---|
| TRANSFORMER SURVIVABILITY SUBJECT TO A FUTURE THROUGH-FAULT |
| ESTIMATE REMAINING LIFE REMOVED DUE TO A FUTURE THROUGH-FAULT: $\%RL_{FLT(FUTURE)}$  238 |
| 236 — $I_{FLT(FUTURE)}$ = PREDICTED FAULT CURRENT BASED ON MEAN OF PREVIOUS FAULT(S) <br> 234 — $T_{CT}$ = CLEARING TIME SETTING FOR TRANSFORMER RELAYS, SECONDS |
| THEREFORE:    238    236    233 <br> $\%RL_{FLT(FUTURE)} = I_{FLT(FUTURE)} + T_{CT}$ ← 240 |
| COMPARE WITH CURRENTLY ESTIMATED REMAINING LIFE: <br><br> WHERE: — 242 <br> $\%RL_{CURR}$ = REMAINING LIFE PRIOR TO FUTURE FAULT |
| PREDICTION:    238    242 <br> WHEN:    $\%RL_{FLT(FUTURE)} > \%RL_{CURR}$ <br><br> NOTIFICATION:    244 <br>      TRANSFORMER UNLIKELY TO SURVIVE FUTURE THROUGH-FAULT. SUGGEST TRANSFORMER REPLACEMENT <br><br> WHEN:    $\%RL_{FLT(FUTURE)} \leq \%RL_{PREV}$ <br><br> NOTIFICATION:    246 <br>      TRANSFORMER LIKELY TO SURVIVE FUTURE THROUGH-FAULT. |

UTILIZE THERMAL METHOD TO DETERMINE ANOTHER MEASURE OF REMAINING LIFE: %RL$_{THERMAL}$ — 252

---

RECEIVE:
    WINDING HOTTEST SPOT TEMPERATURE OF TRANSFORMER, °C: $\Theta_H$ — 258

---

COMPUTE AGING ACCLERATION FACTOR, $F_{AA}$:

$$254 \rightarrow F_{AA} = \text{EXP}\left(\frac{1500}{383} - \frac{1500}{\Theta_H}\right) \leftarrow 256$$
                                   258

---

COMPUTE EQUIVALENT AGING FACTOR, $F_{EQA}$:

$$260 \rightarrow F_{EQA} = \frac{\sum_{n=1}^{N} F_{AAn}\Delta t}{\sum_{n=1}^{N} \Delta t_n} \quad 254 \leftarrow 262$$

WHERE:
    $F_{EQA}$  IS EQUIVALENT AGING FACTOR FOR THE TOTAL TIME PERIOD
    n     IS INDEX OF THE TIME INTERVAL, t
    N    IS THE TOTAL NUMBER OF TIME INTERVALS
    $F_{AAn}$  IS AGING ACCELERATION FACTOR FOR THE TEMPERATURE WHICH EXISTS DURING THE TIME INTERVAL $\Delta t_n$
    $\Delta t_n$   IS TIME INTERVAL, HOURS

---

CALCULATE % LOSS OF LIFE:

$$250 \rightarrow \text{\% LOSS OF LIFE} = \frac{F_{EQA} \times \Delta t_n \times 100}{\text{NORMAL INSULATION LIFE}} \leftarrow 264$$

---

CONVERT % LOSS OF LIFE TO % REMAINING LIFE, %RL$_{AGING}$:

$$252 \quad \text{\%RL}_{THERMAL} = 100\% - \text{\% Loss of Life} \quad 250 \leftarrow 268$$

TA01: TRANSFORMER AGING CONDITION

ESTIMATED DP: 291
% REMAINING LIFE, DISSOLVED GASES: 23.8%
% REMAINING LIFE, THERMAL: 26.5%
DURATION TO END OF LIFE: 12.2 YEARS

%$RL_{FLT(FUTURE)}$: 1.96%

NOTICE: TRANSFORMER AGING NORMALLY,
PREDICTED OPERATIONAL LIFE 30 YEARS

FIG. 16

NORMAL  CAUTION  ABNORMAL  TA01

$1.156 \times 10^{-6}$   $4.076 \times 10^{-6}$

TIME (YEARS)

ABNORMAL LEVEL (1.071 ML/G)
CAUTION LEVEL (0.304 ML/G)

RATE OF DISSOLVED GAS FORMATION
$CO + CO_2$ (mL/g·hr)

METHOD AND SYSTEM FOR ESTIMATING TRANSFORMER REMAINING LIFE

TECHNICAL FIELD OF THE INVENTION

The present invention relates generally to the field of transformer management and fault monitoring systems. More specifically, the present invention relates to dissolved gas analysis (DGA) for estimating remaining life of a transformer.

BACKGROUND OF THE INVENTION

Insulating materials made of cellulose materials, such as kraft paper, pressboard, and the like are typically used in oil-filled power transformers as electrical insulation to separate different circuits within a transformer, to provide mechanical support for the coils, to isolate the winding core and outer case from the circuits, and so forth. In order to perform these functions, insulating materials must have high dielectric strength and high mechanical strength. However, these insulating materials are gradually degraded and lose mechanical strength due to heating (pyrolysis), oxygen (oxidation), and moisture (hydrolysis), which can adversely affect the life of a transformer. For example, the loss of mechanical strength due to degradation of the insulating material causes the transformer winding to become more susceptible to mechanical damage during movement, particularly during extreme events, such as through-faults. Accordingly, the life of a transformer is limited to the life of its solid insulating material.

A technique used to measure the ability of the cellulose insulating material to withstand the stresses within a transformer is through measurement of the degree of polymerization (DP). The cellulose in insulating material is a long chain polymer with repeating glucose bonds, and a measure of the number of these repeating glucose bonds per unit is the degree of polymerization. A typical insulating material has an average degree of polymerization of approximately one thousand when new. However, as glucose bonds in insulating material are broken, the degree of polymerization is reduced. Thus, aged, i.e., degraded, insulating material with a degree of polymerization of less than two hundred may be too brittle to effectively withstand mechanical stresses within the transformer. Consequently, a test to measure the degree of polymerization can be performed to assess insulation aging.

In operating transformers, in order to directly measure the degree of polymerization, the transformer is deenergized, and samples of the cellulose insulating material are taken to a laboratory for testing. Obviously, this direct measurement methodology is time consuming and expensive. An indirect way to measure the degree of polymerization is through, furan testing. Furans are major cellulose degradation products that can be found in the transformer insulating oil. Oil samples can be analyzed for furans and compared with furan models to obtain an approximation of the degree of polymerization of the insulating material. However, this approximation technique does not always give consistent results.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a diagram of a first exemplary packet of data elements representing dissolved gases in a transformer and produced by a monitoring device monitoring one of the apparatuses of FIG. 1;

FIG. 3 shows a diagram of a second exemplary packet, of data elements representing dissolved gases in a transformer and produced by the monitoring device monitoring one of the apparatuses of FIG. 1;

FIG. 7 shows a diagram of equations used to calculate a current value of dissolved gases in accordance with the analysis process of FIG. 6;

FIG. 8 shows a table of a tracking database used to store adjustment values for dissolved gases in response to isolated events at, the transformer;

FIG. 9 shows a diagram of equations used to calculate a measure of remaining life lost due to a through-fault in accordance with the analysis process of FIG. 6;

FIG. 10 shows a diagram of equations used to determine an adjustment value for an excess amount of dissolved gases produced from a through-fault;

FIG. 11 shows a diagram of equations used to predict a duration of time to end of life of a transformer;

FIG. 12 shows a diagram of equations used to determine an ability of a transformer to survive a future through-fault based upon its current measure of remaining life;

FIG. 13 shows a diagram of equations used to determine another measure of remaining life of a transformer;

FIG. 15 shows a diagram of a notice of a transformer aging condition that may be presented to one or more responsible parties; and FIG. 16 shows a graph depicting a gas generation rate of dissolved gases in the transformer relative to an age of the transformer.

DETAILED DESCRIPTION

Embodiments of the invention entail an analysis method, computer-readable medium containing executable code, and system for assessing aging of cellulose insulating materials and estimating a remaining useful life of transformers monitored by monitoring units. Embodiments are described in connection with monitoring transformers located at substations of an electric utility company, and monitoring is performed by dissolved gas analysis (DGA) units, one or more of the DGA units performing on-line monitoring of one each of the transformers. Analysis in accordance with the present invention provides an indirect estimate of the degree of polymerization (DP) of insulating material in a transformer by analyzing an amount of dissolved gases, and particularly carbon monoxide (CO) and carbon dioxide ($CO_2$), in the transformer oil as monitored by the DGA units.

Accordingly, a transformer need not be taken off-line to assess degradation of the insulating material in a transformer.

Moreover, this estimate of DP can be used to estimate a measure of the remaining useful life of a transformer based upon dissolved gas values received from the DGA units. Results from the analysis can be utilized to determine a transformer aging condition, to determine an ability of a transformer to survive a through-fault, to determine when a transformer may need to be serviced or otherwise replaced, and so forth.

Figure 1:
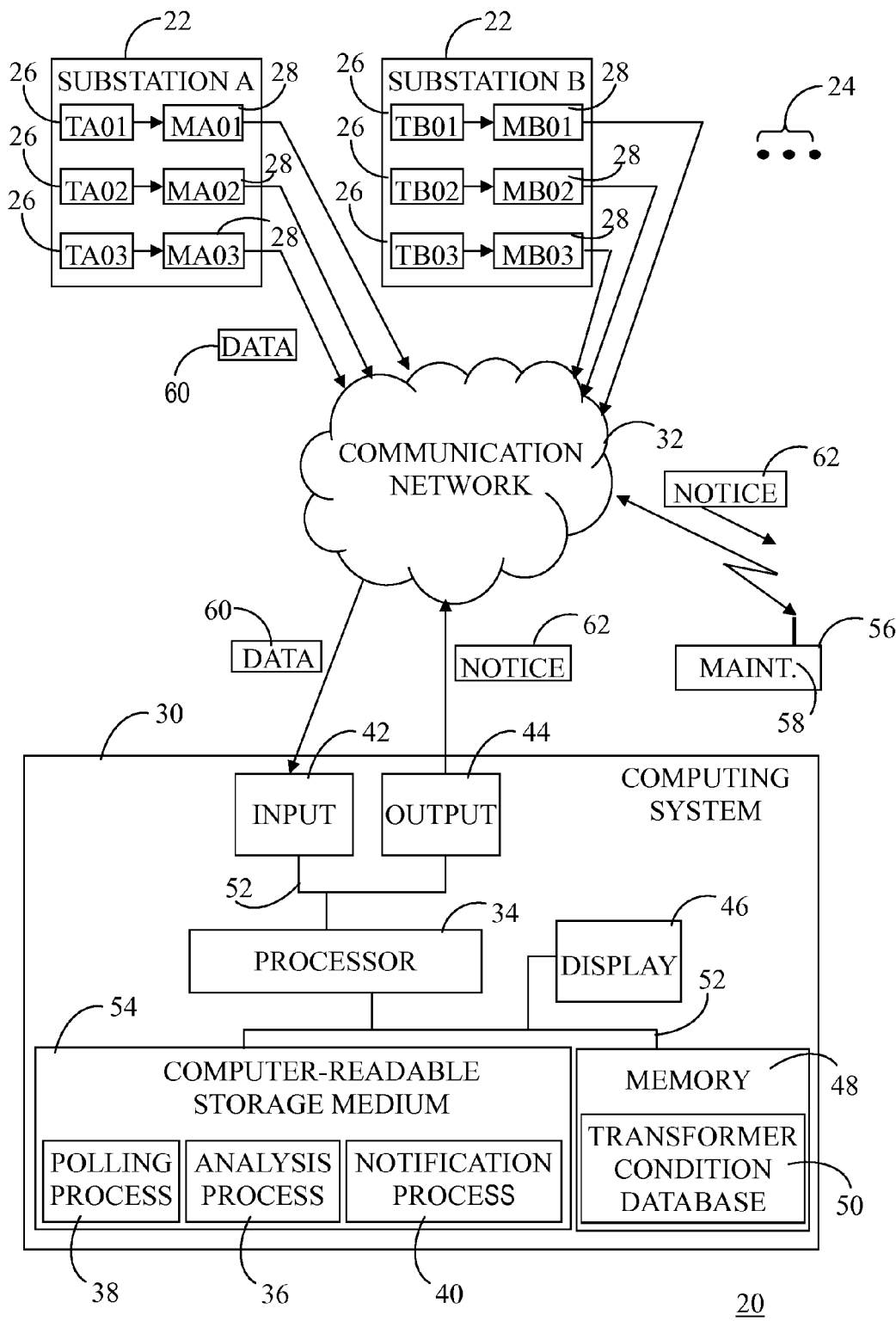
FIG. 1 shows a block diagram of a portion of a facility in which analysis of data elements to estimate remaining life of a transformer takes place in accordance with the present invention.

FIG. 1 shows a block diagram of a portion of a facility 20 in which analysis of data elements and estimation of remaining life of transformers take place in accordance with an embodiment. Facility 20 includes a plurality of substations 22, of which only two are shown. Additional substations 22 are represented by ellipsis 24. A plurality of apparatuses, in the form of transformers 26, is located at each of substations 22. Only three transformers 26 are shown at each of substations 22 for simplicity of illustration. However, it should be understood that each of substations 22 can include any number of transformers 26, as known to those skilled in the art.

Each of transformers 26 is monitored by one or more of a plurality of dissolved gas analyzer (DGA) units 28. DGA units 28 monitor transformer fluid, typically of a mineral oil origin. DGA units 28 monitor, for example, eight gases that are a product of the degradation of the mineral oil-based transformer fluid. These eight gases can include hydrogen ($H_2$), oxygen ($O_2$), carbon monoxide (CO), carbon dioxide ($CO_2$), methane ($CH_4$), acetylene ($C_2H_2$), ethylene ($C_2H_4$), and ethane ($C_2H_6$).

Facility 20 further includes a computing system 30 in communication with DGA units 28 via a communication network 32. In a preferred embodiment, computing system 30 may be located at an energy control center (not shown) operated by electric utility facility 20. However, processing system 30 may alternatively be outsourced to a contracted third party monitoring facility 20.

Computing system 30 includes a processor 34 for executing an analysis process 36 in accordance with the present invention. Processor 34 may also execute an optional polling process 38 and a notification process 40. Processor 34 is in communication with an input device 42, an output device 44, a display 46, and a memory system 48 for storing a transformer condition database 50 that may be generated in response to the execution of analysis process 36. These elements are interconnected by a bus structure 52. Those skilled in the art, will, recognize that analysis process 36, polling process 38, and notification process 40 need not be distinct physical units, but may instead be realized as a single, integrated process. The specific configuration of computing system 30 depends, at least in part, on the complexity of facility 20, the number of DGA units 28 providing data to processing system 30, and the amount of data being processed.

Input device 42 can encompass a keyboard, mouse, pointing device, audio device (e.g., a microphone), and/or any other device providing input to processor 34. Output device 44 can encompass a printer, an audio device (e.g., a speaker), and/or other devices providing output from processor 34. Input and output devices 42 and 44 can also include network connections, modems, or other devices used for communications with other computer systems or devices via communication network 32.

Computing system 30 also includes a computer-readable storage medium 54. Computer-readable storage medium 54 may be a magnetic disk, compact disk, or any other volatile or non-volatile mass storage system readable by processor 34. Computer-readable storage medium 54 may also include cooperating or interconnected computer readable media, which exist exclusively on computing system 30 or are distributed among multiple interconnected computer systems (not shown) that may be local or remote. Analysis process 36, polling process 38, and notification process 40 are recorded on computer-readable storage medium 54 for instructing processor 34 to perform polling, analysis, and notification functions, as discussed below.

Facility 20 may also include notification devices 56, of which only one is shown. Notification devices 56 may be conventional handheld communications devices, such as pagers, cellular phones, personal digital assistants, or a combination thereof. Alternatively, notification devices 56 may be desktop computers or any other means for producing an electronic message to the users of notification devices 56. Notification devices 56 may be in communication with computing system 30 via communication network 32. Communication network 32 may communicate via conventional wireless and/or wireline techniques well known to those skilled in the art.

Each of notification devices 56 may be assigned to, or associated with, a particular responsible party 58. In this illustration, responsible party 58 may be a maintenance team of one or more individuals that are responsible for transformers 26 at particular substations 22, are most knowledgeable of the corrective measures needed for particular fault conditions, and/or have an appropriate level of authority to make decisions regarding transformers 26.

In general, DGA analyzers 28 sample fluid within transformers 26 and monitor for dissolved gases in the sampled fluid. Samples may nominally be taken every four hours. However, the sample rate may increase to hourly if predefined thresholds for an individual gas, or if a predefined rate of change for an individual gas, is reached. Dissolved gas monitoring at DGA units 28 entails measurement of values for each of a number of dissolved gases within transformer fluid. These measurements are subsequently communicated as data elements 60 to computing system 30 via communication network 32. Communication of data elements 60 from DGA units 28 may take place automatically and/or in response to a polling signal communicated via polling process 38. Alternatively, data elements 60 can be taken manually. These manual measurements can be manually input into processing system 30 per conventional data entry methodology. Data elements 60 are analyzed by analysis process 36, and the results of the analysis can be recorded in transformer condition database 50 and/or can be provided via notification process 40 to one or more notification devices 56 assigned to one or more responsible parties 58 in the form of a notice 62.

Referring to FIGS. 2 and 3, FIG. 2 shows a diagram of a first exemplary packet 64 of data elements 60 produced by one of DGA units 28 (FIG. 1) monitoring one of transformers 26 (FIG. 1). FIG. 3 shows a diagram of a second exemplary packet 66 of data elements 60 produced by DGA unit 28 monitoring transformer 26. Each of packets 64 and 66 desirably includes a transformer identifier 68, shown herein as "TA01" identifying one of transformers 26. Each of packets 64 and 66 further includes data elements 60 as values 70 for each of a number of dissolved gases 72 that are being monitored by DGA unit 28. Additional information, not shown herein, may be included such as time/date collected, other dissolved gases 72 not listed therein, and so forth.

First and second packets 64 and 66 are illustrated herein to portray the information that may be provided from DGA units 28 (FIG. 1) to computing system 30 (FIG. 1) for analysis and subsequent selective notification in accordance with the present invention. The particular configuration of data elements 60 and first and second packets 64 and 66, respectively, for transmission can take a variety of forms and transmission can be accomplished via a variety of techniques known to those skilled in the art.

FIG. 2 generally shows first packet 64 representing a normal condition 74 in which transformer 26, identified by "TA01" is behaving normally. Normal condition 74 may be determined when values 70 for each of dissolved gases 72 fall within pre-established limits that define normal condition 74. These pre-established limits may be provided in an industry recognized standard such as the IEEE Std C57.104-2008 "IEEE Guide for the Interpretation of Gases Generated in Oil-Immersed Transformers" or from other sources.

In contrast, FIG. 3 generally shows second packet 66 representing an abnormal condition 76, in which transformer 26, identified by "TA01" may be behaving abnormally. Abnormal condition 76 may be determined when some or all values 70 for dissolved gases 72 have risen to more critical condition levels, In this example, carbon monoxide (CO) level has risen to a value that is above normal desired limits. The industry recognized standard, IEEE Std C57.104-2008 "IEEE Guide for the Interpretation of Gases Generated in Oil-Immersed Transformers," further classifies a transformer's behavior based on values 70 for dissolved gases 72 as a combination of four fault types: high energy discharge with arcing (HEDA), low energy discharge (LED), overheating oil (OHO), or cellulose degradation (CD).

The product of cellulose degradation in the cellulose insulating material in oil-filled transformers is CO and carbon dioxide ($CO_2$). Consequently, values 70 for CO and $CO_2$ gases 72 can illicit notification of a cellulose degradation fault type. The cellulose degradation fault type can provide a user with some indication that there is insulation degradation (i.e., abnormal aging), but it does not provide information on remaining useful life of the transformer.

Data analysis process 36 (FIG. 1) circumvents this problem by utilizing the measurement (i.e., values 70) of CO and $CO_2$ gases 72 received from the on-line DGA units 28 (FIG. 1) to estimate a degree of polymerization (DP) value. From this estimate of DP, a prediction can be made as to remaining useful life of transformers 26 (FIG. 1). Such a feature can increase the ability of a utility company to conveniently schedule repairs so as to lower maintenance costs, defer capital expenditures by extending transformer replacement date, provide advance warning of developing faults that could lead to catastrophic transformer failure and unplanned outages, and so forth. The operations of data analysis process 36 will be discussed in detail in connection with FIG. 6.

Figure 4:
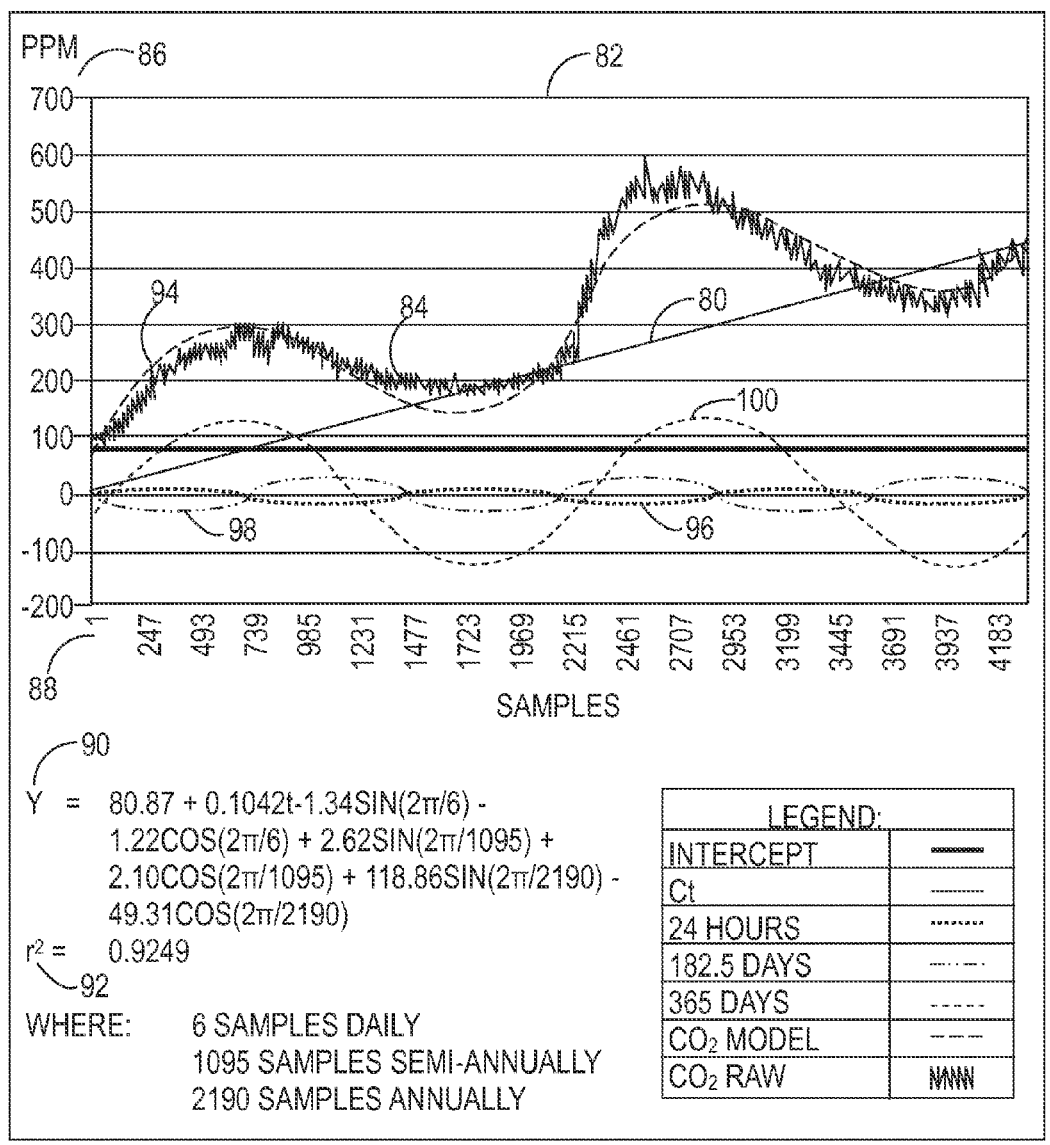
FIG. 4 shows a diagram of an exemplary result of a harmonic regression prediction equation that, yields a linear fit for the non-harmonic portion of a gas generation rate.

FIG. 4 shows a diagram 78 of an exemplary result of a harmonic regression prediction equation that yields a linear fit for the non-harmonic portion of a gas generation rate 80. Transformers 26 (FIG. 1) can have load-dependent internal faults and exhibit normal cyclic gassing rates due to cyclic loading of transformer 26. Thus, values 70 (FIG. 2) that are above normal limits due to normal cyclic loading may introduce error into subsequent analysis computations. In some embodiments it may be useful stabilize the measured gassing rates, i.e., identify a "steady state" gas generation rate 80, from cyclic or periodic loading characteristics.

In an example, diagram 78 includes a graph 82. Graph 82 includes a first plot 84 of values 86 relative to time 88 of dissolved carbon dioxide gas 72 found in transformer oil and obtained from data elements 60 (FIG. 2). In this example, time 88 coincides with samples. That is, since transformer oil is sampled every four hours, the numerical value of six samples corresponds to twenty four hours. Commensurately, the numerical value of one thousand ninety-five samples corresponds to one half of a year, and the numerical value of two thousand one hundred ninety samples corresponds to a year.

First plot 84 represents the actual values 70 (FIG. 2) of carbon dioxide gas 72 found in transformer oil over a period of time 88. In an example, diagram 78 includes a solution 90, where Y equals a predicted carbon dioxide gas value at time, t, to a harmonic regression equation having a high "goodness of fit" as represented by an $r^2$ parameter 92. Graph 82 further includes a second plot 94 that is generated in response to the derived solution 90. Thus, second plot 94 is a "best fit" representation, or model, of the actual values of carbon dioxide modeled using solution 90. For illustrative purposes, graph 82 also includes periodic characteristics of a daily fluctuation 96, a semi-annual fluctuation 98, and an annual fluctuation 100 of transformer loading.

In this example, the sinusoidal components of daily fluctuation 96, semi-annual fluctuation 98, and annual fluctuation 100 can be removed, or canceled, from solution 90 so that an accurate trend in the form of "steady state" gas generation rate 80 can be determined. Gas generation rate 80 can be used in combination with estimated degree of polymerization values to determine the duration until end of life of one of transformers 26 will be reached, as will be discussed below in connection with FIG. 11 and/or to plot a three way relationship between an amount of $CO+CO_2$ dissolved gases 72 formed, a gas generation rate of $CO+CO_2$, and age of transformer 26, as will be discussed below in connection with FIG. 16.

Figure 5:
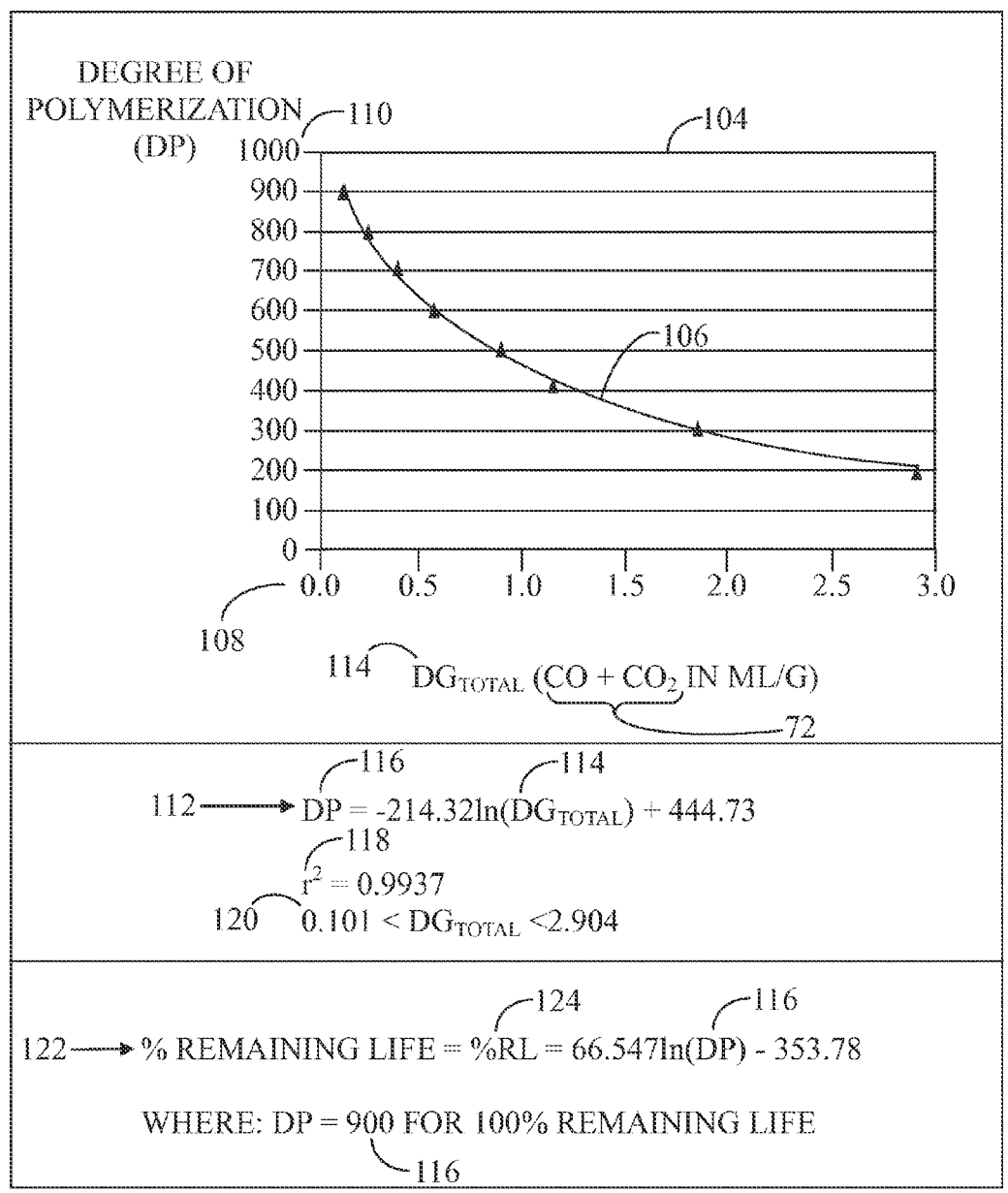
FIG. 5 shows a diagram of equations used to estimate a measure of remaining life of a transformer based upon a value of the dissolved gases in the transformer in accordance with the present invention.

FIG. 5 shows a diagram 102 of equations used to estimate a measure of remaining life of one of transformers 26 (FIG. 1) based upon values 70 (FIG. 2) of dissolved gases 72 (FIG. 2) in transformer oil in accordance with the present invention. Diagram 102 includes a graph 104. Graph 104 reveals a plot 106 of values 108 of carbon dioxide (CO) and carbon dioxide ($CO_2$) dissolved gases 72 relative to degree of polymerization values 110. Currently, both insulating paper and pressboards used in oil-filled transformers are formed from cellulose materials. The mechanical strengths of these cellulose materials decrease due to thermal and oxidation deterioration. Consequently, the degree of polymerization is reduced. At the same time gases 72, and most critically CO and $CO_2$, are formed.

A relationship was derived using direct measurement of the degree of polymerization and the formation of CO and $CO_2$ dissolved gases 72 resulting from the degradation of insulating paper in a transformer. Experiments reveal that insulating paper produces approximately eighty percent of CO and $CO_2$ dissolved gases 72 in the transformer oil, and the pressboard produces the additional twenty percent of CO and $CO_2$ dissolved gases 72 in the transformer oil. Thus, the direct measurement of the degree of polymerization and the formation of CO and $CO_2$ dissolved gases 72 resulting from the degradation of insulating paper in a transformer can be adjusted approximately twenty-five percent to account for the formation of CO and $CO_2$ dissolved gases 72 from pressboard. The resulting combination yields plot 106, i.e., a graphical representation of the relationship between the degree of polymerization and the formation of CO and $CO_2$ dissolved gases 72.

This relationship between the degree of polymerization and the formation of CO and $CO_2$ dissolved gases 72 can additionally be estimated by a degree of polymerization equation 112 presented in diagram 102. A total value 114 of the combined amount of CO and $CO_2$ dissolved gases 72 is represented by the nomenclature "$DG_{TOTAL}$ value," and is referred to herein as $DG_{TOTAL}$ value 114. $DG_{TOTAL}$ value 114 is expressed in milliliters/gram. A degree of polymerization value 116 ascertained by solving equation 112 is represented by the nomenclature "DP value 116." In this instance, equation 112 has a high "goodness of fit" as represented by an $r^2$ parameter 118. Accordingly, equation 112 can be used to estimate DP value 116 of one of transformers 26 (FIG. 1) using a current total measure of the combined amount of CO and $CO_2$ dissolved gases 72, i.e., $DG_{TOTAL}$ 116.

Equation 112 is valid for $DG_{TOTAL}$ values 114 in a range 120 between 0.101 ml/g and 2,904 ml/g. Consequently, equation 112 is valid for DP values 116 between nine hundred and two hundred. Very low $DG_{TOTAL}$ values 114 below approximately 0.10.1 ml/g may reported as DP value 116 being greater than nine hundred. Similarly, high. $DG_{TOTAL}$ values 114 above approximately 2.904 ml/g are reported as DP value 116 being less than two hundred.

Once DP value 116 has been predicted, DP value 116 can then be converted into a measure of the remaining useful life of transformer 26. Facilities Instructions, Standards, and Techniques, Volume 3-31, "Transformer Diagnostics," June 2003, United States Department of the Interior, Bureau of Reclamations, Table 6, "Furans, DP, Percent of Life Used, of Paper Insulation" provides values for degree of polymerization to percent remaining life. Table 6 proposes a DP value of eight hundred for one hundred percent remaining life. The values within Table 6 have been adjusted in accordance with an embodiment so that DP value 116 of nine hundred corresponds to one hundred percent remaining life in order to be consistent with equation 112. Whereas DP value 116 of two hundred corresponds to end of life of transformer 26. The adjusted values have been estimated by an equation 122 presented in diagram 102.

DP value 116 can be applied to equation 122 in order to determine a measure of remaining useful life of one of transformers 26. This measure of remaining useful life is presented in terms of percent remaining life 124 and is represented by the nomenclature "% RL" 124. Embodiments discussed below will present to one or more responsible parties 58 (FIG. 1) the % RL 124 from the estimate of DP value 116.

Figure 6:
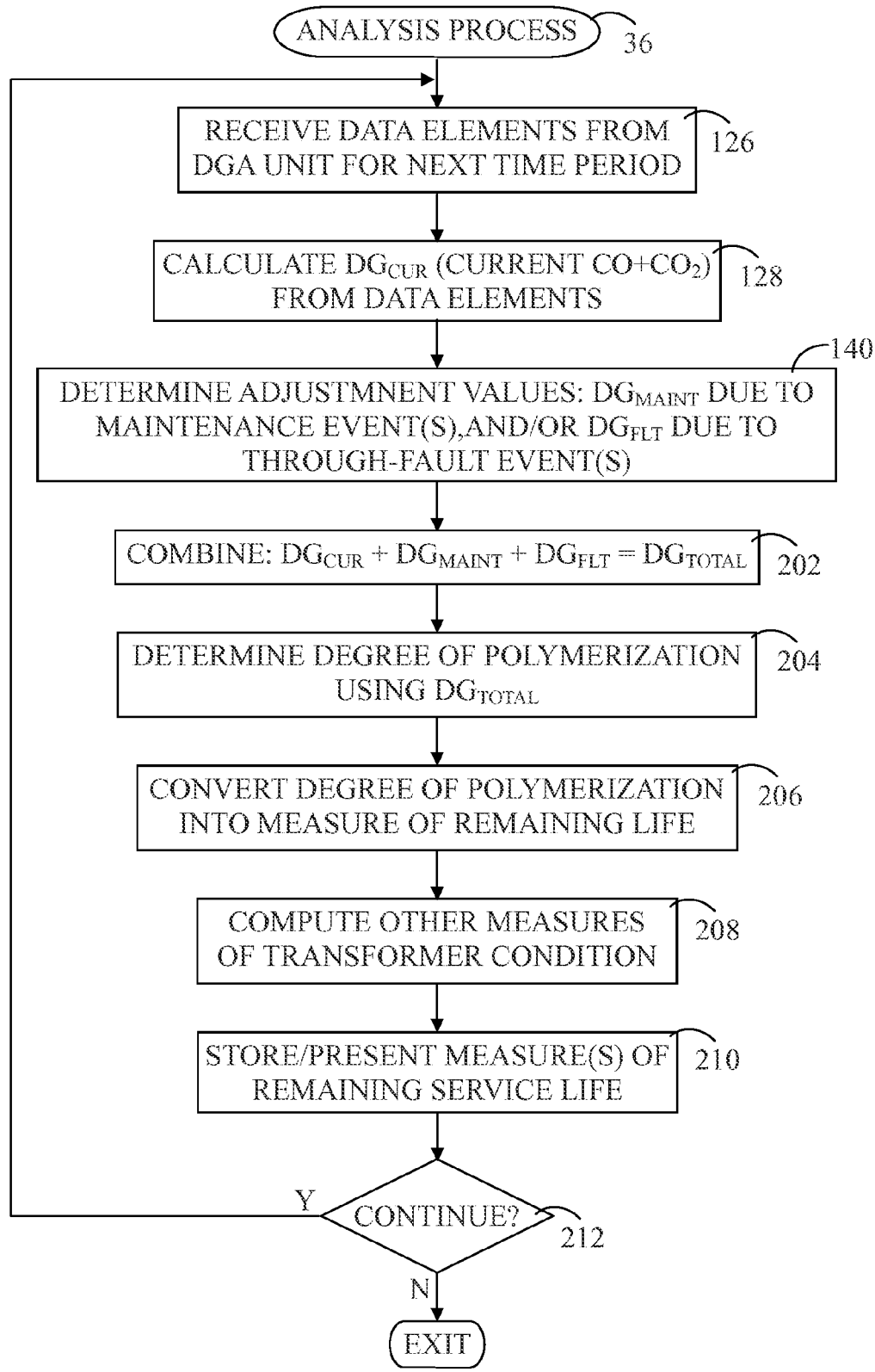
FIG. 6 shows a flowchart of an analysis process in accordance with the present invention.

FIG. 6 shows a flowchart of analysis process 36 in accordance with the present invention. Analysis process 36 is executed by processor 34 (FIG. 1) to obtain results that can be used to estimate a degree of polymerization value, i.e., DP value 116 (FIG. 5), obtain a measure of remaining useful life, i.e., % RL 124, and to compute any additional measure of transformer aging. Analysis process 36 is discussed in connection with dissolved gas analysis of data elements 60 received from one of DGA units 28 (FIG. 1) monitoring one of transformers 26. However, analysis process 36 can be executed for data elements 60 received from any of a plurality of DGA units 28 each of which is monitoring a separate one of transformers 26.

Analysis process 36 begins with a task 126. At task 126, processor 34 (FIG. 1) receives a plurality of data elements 60 that were previously collected from one of DGA units 28 over a desired time period. In one embodiment, one of DGA monitors 28 (FIG. 1) provides data elements 60 containing values 70 (FIG. 2) for a number of gases 72 (FIG. 2) every four hours, providing two thousand one hundred ninety samples (i.e., values 70 per gas 72) per year. Accordingly, this plurality of values 70 need not be downloaded from one of DGA units 28 at one time, but may alternatively, have been collected periodically and saved in a data file (not shown) in computing system 30 (FIG. 1) for later processing.

Analysis process 36 continues with a task 128. At task 128, a current value of $CO+CO_2$ dissolved gases 72 is calculated from the received data element 60.

Referring to FIG. 7 in connection with task 128, FIG. 7 shows a diagram 130 of equations used to calculate a current value of $CO+CO_2$ dissolved gases 72 in accordance with task 128 of analysis process 36. Diagram 130 includes an exemplary equation 132 illustrating the conversion of values 70 for $CO+CO_2$ dissolved gases 72 taking into account the volume of oil in transformer 26 and the weight of insulating material within transformer 28. A current value 134 of $CO+CO_2$ dissolved gases 72 is represented herein by the nomenclature "$DG_{CUR}$ 134" and is presented in milliliters/gram.

In order to appropriately calculate $DG_{CURR}$ 134 in ml/g, known values include a volume 136 of oil within transformer 26, represented by a parameter "X," and a weight 138 of insulating material within transformer 26, represented by a parameter "Y." Volume 136 and weight 138 may be obtained from the utility company's asset management database. On-line DGA unit 28 (FIG. 1) provides data elements 60, particularly values 70 for $CO+CO_2$ dissolved gases 72 in parts-per-million. As illustrated in equation 132, a summation of values for $CO+CO_2$ dissolved gases 72 in parts-per-million is converted into ml/l, where one ml/l is equal to one thousand parts-per-million. Volume 136 of oil in gallons is converted into liters of oil, where one gallon of oil is equal to 3.7854 liters. The gas level, in ml/l is multiplied by the number of liters of oil in transformer 26. Weight 138 of insulating material in pounds is converted into grams, where one pound is equal to 453.59237 grams. Once all conversions are made, $DG_{CUR}$ 134, representing the total, i.e., current, amount of $CO+CO_2$ dissolved gases 72 in ml/g may be calculated for the current sample. Those skilled in the art will readily recognize that certain conversions need not be made when volume 136 and/or weight 138 are already in liters and grams, respectively.

Referring back to FIG. 6, following task 128, analysis process 36 continues with a task 140. At task 140, one or more adjustment values are determined for $CO+CO_2$ dissolved gases 72 in response to one or more isolated events occurring at transformer 26 (FIG. 1). These isolated events are referred to herein as a maintenance event and a through-fault event.

During the lifetime of transformer 26, transformer 26 may have undergone maintenance. Per convention, if the transformer oil was drained during maintenance, then the transformer oil would have been "processed" during the transformer refilling procedure. This "processing" removes dissolved gases 72 from the transformer oil. The amount of $CO+CO_2$ dissolved gases 72 removed during a maintenance event is referred to herein as an adjustment value, $DG_{MAINT}$ 142 (see FIG. 8).

A through-fault event is a fault on a system, e.g., transformer 26, outside the zone of protection of, for example, a relay, where all or some of the fault current flows through the protected zone in question. A through-fault event can occur when one or more electrical conductors contact ground and/or each other. The fault current produced by such a through-fault event is typically several times larger in magnitude than the current that normally flows through the circuit. A through-fault event results in mechanical damage to the insulating material. This mechanical damage will result in a reduced degree of polymerization, but does not produce dissolved gases. In an embodiment, an equivalent amount of $CO+CO_2$ dissolved gases 72 is calculated for a through-fault event in order to estimate this reduced degree of polymerization. Consequently, a value for the equivalent amount of $CO+CO_2$ dissolved gases 72 as calculated herein represents a reduction of the degree of polymerization due to mechanical damage from a through-fault. The value for the equivalent amount of $CO+CO_2$ dissolved gases 72 is referred to herein as an adjustment value, $DG_{FLT}$ 144 (see FIG. 8).

Referring to FIG. 8 in connection with task 140, FIG. 8 shows a table of a tracking database 146 used to store adjustment values $DG_{MAINT}$ 142 and $DG_{FLT}$ 144 for dissolved gases 72 in response to isolated events at transformer 26. Tracking database 146 includes, for example, a transformer identification field 150, a date/time field 152, an event field 154, a $DG_{MAINT}$ field 156, and a $DG_{FLT}$ field 158. In this example, transformer identification field 150 includes transformer identifiers 68, shown herein as "TA01" and "TA02" identifying transformers 26. Date/time field 152 is shown with dates identifying when particular isolated events occurred. Event field 154 includes identifiers for particular isolated events, for example, through-fault events 160 and maintenance events 162.

$DG_{MAINT}$ field 156 includes a sub-field 161 listing an amount of CO removed during maintenance event 162 and another sub-field 163 listing an amount of $CO_2$ removed during the same maintenance event 162. The amounts of CO and $CO_2$ removed during maintenance events 162 occurring at any of transformers 26 (FIG. 1) may simply be recorded in tracking database 146. Collectively, the respective amounts of CO and $CO_2$ in each of sub-fields 161 and 163 can be summed to provide $DG_{maint}$ 142, an adjustment value representative of the total amount of CO+$CO_2$ dissolved gases 72 removed during maintenance event 162. $DG_{FLT}$ field 158 provides an adjustment value, $DG_{FLT}$ 144, for through-fault events 160. The computation of adjustment values, $DG_{FLT}$ 144, for through-fault events 160 will be discussed in connection with FIGS. 9 and 10.

In this example, adjustment values, $DG_{MAINT}$ 142 for maintenance events 162 and adjustment values, $DG_{FLT}$ 144, for through-fault events 160 are provided in parts per million. However, it should become apparent in the ensuing discussion that adjustment values $DG_{MAINT}$ and $DG_{FLT}$ 142 and 144, respectively, may be stored in tracking database 146 in units other than what is shown, and the appropriate conversions can be performed as needed. Additionally, those skilled in the art will recognize that tracking database 146 and its contents can vary greatly from that which is shown.

FIG. 9 shows a diagram 164 of equations used to calculate a measure of remaining life lost due to a through-fault in accordance with analysis process 36 (FIG. 6). Through-faults put large mechanical stresses on the insulating material within transformer 26 (FIG. 1), and thus adversely affect the lifetime of the insulating material through a reduction of the degree of polymerization. Although CO+$CO_2$ dissolved gases 72 are not actually produced in response to a through-fault, an equivalent amount of CO+$CO_2$ dissolved gases 72 is calculated for a through-fault event 160 (FIG. 8) that represents this reduction of the degree of polymerization. The equivalent amount of CO+$CO_2$ dissolved gases 72 are determined to produce adjustment values, $DG_{FLT}$ 144 (FIG. 8) so as to obtain an accurate measure of a total amount of CO+$CO_2$ in transformer oil.

The impact of fault current may be determined by using IEEE C57.109-1993, "IEEE Guide for Liquid-Immersed Transformer Through-Fault-Current Duration," FIGS. 1 through 4. IEEE C57.109-1993 divides transformers into Classes I through IV. These classes are created based upon the size of the transformers. The largest size transformers are in Class IV, and are single phase transformers greater than 10 megavolt ampere (MVA) or three phase transformers greater than 30 MVA. It may not be cost effective to use on-line DGA monitoring for transformers smaller than Class IV. As such, FIG. 9 provides equations for Class IV transformers only. However, those skilled in the art should recognize that the concept may be adapted for transformers that are smaller than Class IV.

IEEE Std C57.1.09-1993 provides standard operating limits for power transformers in the form of through-fault protection curves. For example, IEEE Std C57.109-1993 provides curves which may be used to determine the maximum through-fault current duration for various categories of liquid-immersed transformers. IEEE Std C57.109-1993 further provides curves for each of the transformer classes which show a thermal duty limit curve and a mechanical duty limit curve. For example, for Class IV transformers, the mechanical duty limit curve starts at about 50% of the maximum short-circuit current, With continued reference to FIG. 9, IEEE Std C57.109-1993 implies that a maximum, lifetime through fault strength, K, 166 of transformer 26 (FIG. 1) may be represented by an equation 168, where time, T, is two seconds, and Imax is the maximum fault current. In accordance with an embodiment, a percent remaining life removed, % $RL_{FLT}$ 170, by through-fault event 160 (FIG. 8) is the percent of the maximum fault strength, K, 166 for transformer 26. A maximum fault current, (max 172, may be calculated by an equation 174, where BASE MVA refers to base megavolt ampere, $V_{SECONDARY}$, is the secondary voltage of transformer 26, and $Z_T$ is the impedance of transformer 26.

IEEE Std C57.109-1993 further implies that the protection curve for a Class IV transformer depends on the transformer impedance when the fault current exceeds about 50% of maximum fault current, $I_{MAX}$ 172. For example, when a fault current, $I_{FLT}$ 176, is less than $I_{MAX}/2$, the damage is primarily thermal and when fault current, $I_{FLT}$ 176, is greater than $I_{MAX}/2$, the damage is primarily mechanical. Consequently, maximum fault current, $I_{MAX}$ 172 divided by two ($I_{MAX}/2$) is utilized herein as a break point for two different equations used to solve for percent remaining life removed, % $RL_{FLT}$ 170.

When fault current, $I_{FLT}$ 176, is greater than $I_{MAX}/2$, percent remaining life removed, % $RL_{FLT}$ 170 is calculated using an equation 178, where % $RL_{FLT}$ 170 is calculated as a function of $I_{FLT}$ 176, a fault duration, $T_{FLT}$ 180 in seconds, and maximum fault current, $I_{MAX}$ 172. Conversely, when fault current, $I_{FLT}$ 176, is less than or equal to $I_{MAX}/2$, percent remaining life removed, % $RL_{FLT}$ 170 is calculated using an equation 182, where % $RL_{FLT}$ 170 is calculated as a function of lifetime through fault strength, K, 166, determined from a table 184, and maximum fault current, $I_{MAX}$ 172.

FIG. 10 shows a diagram 186 of equations used to determine an adjustment value, $DG_{FLT}$ 144, for an equivlent amount of dissolved gases due to a through-fault. In an embodiment, after percent remaining life removed, % $RL_{FLT}$ 170, is determined using either of equations 178 or 182, as explained in connection with FIG. 9, adjustment value, $DG_{FLT}$ 144 may be computed using degree of polymerization equation 112 and percent remaining life equation 122.

In diagram 186, a percent remaining life value prior to through-fault, referred to herein as % $RL_{PREV}$ 190, is known. Additionally, percent remaining life removed, % $RL_{FLT}$ 170 and a previous dissolved gas value, referred to herein as $DG_{PREV}$ 192 are known. Previous dissolved gas value, $DG_{PREV}$ 192 may be $DG_{TOTAL}$ 114 (FIG. 5) and % $RL_{FLT}$ 170 may be % RL 124 (FIG. 5) each of which were determined during a previous iteration of analysis process 36 (FIG. 6). Now $DG_{TOTAL}$ 114 for the current iteration of analysis process 36 (FIG. 6) may be set to the sum of $DG_{PREV}$ 192 and $DG_{FLT}$ 144, as represented by an equation 194, and percent remaining life, % RL 124 may be set to the difference between previous percent remaining life value % $RL_{PREV}$ 190 and percent remaining life removed, % $RL_{FLT}$ 170, as represented by an equation 196.

Combining equation 112 for degree of polymerization and equation 122 for percent remaining life yields an equation 198, which can be solved for $DG_{FLT}$ 144, as represented by another equation 200. Thus, adjustment value $DG_{FLT}$ 144 represents the equivalent amount of dissolved gases ($CO + CO_2$) 72 due to a through-fault event 160 (FIG. 160). The computed adjustment value, $DG_{FLT}$ 144, is subsequently recorded in tracking database 146 (FIG. 8.).

Referring back to task 140 of analysis process (FIG. 6), following the determination of adjustment values of $DG_{MAINT}$ 142 and $DG_{FLT}$ 144, discussed in detail above, analysis process 36 continues with a task 202. At task 202, all adjustment values $DG_{MAINT}$ 142 (FIG. 8) and $DG_{FLT}$ 144 (FIG. 8) from tracking database 146 (FIG. 8) for a particular one of transformers 26 (FIG. 1) are summed and included with current $CO+CO_2$ dissolved gas value, $DG_{CUR}$ 134 (FIG. 7) to obtain total $CO+CO_2$ dissolved gas value, $DG_{TOTAL}$ value 114.

Following task 202, a task 204 is performed. At task 204, degree of polymerization value, DP value 116, is determined using $DG_{TOTAL}$ value 114 applied to equation 112 (FIG. 5)

Next, a task 206 is performed. At task 206, degree of polymerization value, DP value 116, is converted to a measure of remaining life for transformer 26. In particular, equation 122 (FIG. 5) is solved using DP value 116 to obtain percent remaining life, % RL 124 (FIG. 5) for transformer 26.

Analysis process 36 continues with a task 208. At task 208, additional measures of transformer condition may be computed from percent remaining life, % RL 124, and/or to corroborate percent remaining life, % RL 124. Additional measures of transformer condition may include, for example, prediction of a duration of time until end of life of transformer 26, prediction of an ability of transformer 26 to survive a future through-fault event, prediction of remaining life based upon thermal methodology, and so forth. These additional measures of transformer condition will be discussed below in connection with FIGS. 11-13.

Following task 208, a task 210 is performed. At task 210, the various measures of remaining life, e.g., percent remaining life, % RL 124 for transformer 26, may be stored in transformer condition database 50 (FIG. 1) and/or the various measures of remaining life may be presented to a user via, for example, display 46 (FIG. 1). Notification of the results of analysis process 36 may also be conveyed to responsible party 58 (FIG. 1), as will be discussed below in connection with FIGS. 14-16.

Following task 210, a query task 212 determines whether analysis process 36 is to continue. Data elements 60 may be available from the same one of transformers 26 for a subsequent period of time. Furthermore, data elements 60 may be available for other transformers 26 (FIG. 1) within facility 20 (FIG. 1) for which analysis is called for. Accordingly, should a user wish to continue analysis at query task 212, process control loops back to task 126 to receive data elements 60 from one of DGA monitors 28 (FIG. 1) associated with a particular one of transformers 26. However, should the user wish to discontinue analysis process 36 at query task 212, analysis process 36 exits.

The following discussion of FIGS. 11-13 provides an exemplary description of additional measures of transformer condition that may be computed. It should be understood that some or all of the computations discussed in connection with FIGS. 11-13 may be provided with degree of polymerization, DP value 116 (FIG. 5) and percent remaining life, % RL 124 (FIG. 5) for presentation to a user.

Referring now to FIG. 11, FIG. 11 shows a diagram 214 of equations used to predict a duration until end of life of one of transformers 26, i.e. ENDLIFE(T) 216. A transformer 26 may be designed for an operational life of, for example, thirty years. However, due to adverse operating conditions, for example, through fault events 160 (FIG. 8), heat, moisture, and oxidation, transformer 26 may effectively be aging faster than designed. Accordingly, it may be advantageous to visualize transformer life, not just by percent remaining life, % RL, but additionally by an estimate of how many years transformer 26 has until it should be replaced. That is, a user may find it highly informative to receive notification that, for example, a transformer has less than eight percent of its remaining life left, which equates to three years duration until end of life.

In order to estimate duration until end of life, ENDLIFE(T) 216, degree of polymerization equation 112 may be solved for a future dissolved gas value, $DG_{FUTURE}$ 218, needed to reach a minimum allowable degree of polymerization (DP) value 116. It should be recalled in connection with FIG. 5 that DP value of two hundred corresponds to end of life of transformer 26. Accordingly, duration until end of life, ENDLIFE (T) 216 is reported in years to reach DP value 116 of two hundred.

In diagram 214, DP value 116 of two hundred is known. Additionally, a previous dissolved gas value, referred to herein as $DG_{PREV}$ 220 is known. Previous dissolved gas value, $DG_{PREV}$ 220, may be $DG_{TOTAL}$ 114 (FIG. 5) determined during a previous iteration of analysis process 36 (FIG. 6). Therefore, $DG_{PREV}$ 220 includes $DG_{MAINT}$ 142 (FIG. 8) and $DG_{FLT}$ ∴ (FIG. 8). In order to find duration until end of life, ENDLIFE(T) 216, $DG_{TOTAL}$ 114 may be set to the difference between $DG_{FUTURE}$ 218 and $DG_{PREV}$ 220, as represented by an equation 222. This difference between $DG_{FUTURE}$ 218 and $DG_{PREV}$ 220 shown in equation 222 is applied to degree of polymerization equation 112, where DP value 116 is set to two hundred.

Degree of polymerization equation 112 is mathematically manipulated to solve for $DG_{FUTURE}$ 218 as represented by an equation 224. Once $DG_{FUTURE}$ 218 is calculated relative to the current total of dissolved gases value, e.g., $DG_{PREV}$ 220, in accordance with equation 224, duration until end of life, ENDLIFE(T) may be computed utilizing $DG_{FUTURE}$ 218 and a gas generation rate 226 for carbon monoxide (CO) and a gas generation rate 228 for carbon dioxide ($CO_2$). Gas generation rates 226 and 228 may be computed as discussed above in connection with FIG. 4 which distinguishes the "steady state" gas generation rate, from cyclic or periodic loading characteristics. Those skilled in the art will recognize that other techniques for determining gas generation rates 226 and 228 may alternatively be employed.

In an embodiment, $DG_{FUTURE}$ 218 is divided by the sum of the respective gas generation rates 226 and 228, as represented by an equation 230 in order to predict duration until end of life, ENDLIFE(T) 216. Thus, ENDLIFE(T) 216 represents the number of days or years for one of transformers 26 to reach degree of polymerization value 116 (FIG. 5) of two hundred, signaling the end of its remaining service life. ENDLIFE(T) 216 may subsequently be stored in transformer condition database 50 (FIG. 1).

FIG. 12 shows a diagram 232 of equations used to determine an ability of a transformer to survive a future through-fault event 160 (FIG. 8) based upon its current measure of remaining life, % RL 124 (FIG. 5). Again, due to adverse operating conditions, for example, through-fault events 160, heat, moisture, and oxygen, transformer 26 may degrading at an accelerated pace. Accordingly, it may be advantageous to predict whether transformer 26 is capable of surviving a future through-fault event 160 so as to make decisions regarding when and/or whether transformer 26 should be replaced.

Using a clearing time setting, $T_{CT}$ 234 for the protective relays of transformer 26, and a predicted fault current level, $I_{FLT(FUTURE)}$ 236, based upon the mean or the mean plus a standard deviation of previous through-fault events 160 (FIG. 8), a prediction of whether transformer 26 can be expected to withstand the next through-fault event 160 can be estimated. In an embodiment, a percent remaining life removed due to a future through-fault event 160, % $RL_{FLT(FUTURE)}$ 238 may be estimated using the expected next through-fault clearing time setting, $T_{CT}$ 234 and predicted fault current level, $I_{FLT(FUTURE)}$ 236, as represented by an equation 240.

Percent remaining life removed due to a future through-fault event 160, % $RL_{FLT(FUTURE)}$ 238 may be compared with the currently estimated percent of remaining life prior to a future through-fault event, % $RL_{CURR}$ 242 determined during the most recent iteration of analysis process 36 (FIG. 6). If the calculation of the next through-fault event's impact is greater than the currently estimated percent remaining life, i.e., % $RL_{FLT(FUTURE)}$ 238>% $RL_{CURR}$ 242, then a determination can be made that transformer 26 is unlikely to survive a future through-fault event. In such a case, a notice 244 may be presented to user 58 indicating as such and recommending that transformer 26 be replaced. Alternatively, when calculation of the next through-fault event's impact is less than the currently estimated percent remaining life, i.e., % $RL_{FLT(FUTURE)}$238<% $RL_{CURR}$ 242, then a determination can be made that transformer is likely to survive a future through-fault event 160. In such a case, a notice 246 may be presented to user 58 indicating as such. Percent remaining life removed due to a future through-fault event, i.e., % $RL_{FLT(FUTURE)}$ 238 and/or either of notices 244 and 246 may subsequently be stored in transformer condition database 50 (FIG. 1).

FIG. 13 shows a diagram 248 of equations used to determine another measure of remaining life of transformer 26. The industry recognized standard IEEE Std C57.91-1995, "IEEE Guide for Loading Mineral-Oil-Immersed Transformers," Section 5 and Annex I provides a technique for calculating a percent loss of life value 250. This technique uses the hottest spot temperature within transformer 26 to measure deterioration of insulating material in transformer 26 based upon an Arrhenius reaction rate theory. In accordance with an embodiment, percent loss of life value 250 is converted into a percent remaining life due to thermal aging value, % $RL_{THERMAL}$ 252.

The methodology provided in diagram 248 assumes that normal transformer lifetime will be achieved if the transformer hottest spot temperature is 110° C. for its entire life and assigns a Per Unit of Normal Life of 1. In accordance with an embodiment, the Per Unit of Normal Life is presented as one hundred percent in order to be consistent with percent remaining life, % RL 124 (FIG. 5) determined from equation 122 (FIG. 5). Section 5 of IEEE C57.91-1995 proposes equations for "aging acceleration factor" and "equivalent aging."

An "aging acceleration factor," $F_{AA}$ 254, is computed using an equation 256 presented in diagram 248 accounting for a winding hottest spot temperature, $\Theta_H$, 258. An "equivalent aging" value, $F_{EQU}$ 260 is computed using an equation 262 also presented in diagram 248. From these values, percent loss of life 250 can be calculated in accordance with IEEE C57.91-1995, Annex I, and as represented in diagram 248 by an equation 264. Normal insulation life is typically 180,000 hours at 110° C. based upon IEEE C57.91-1995, Table 2. The computed percent loss of life 250 is converted into percent remaining life, % $RL_{THERMAL}$ 252 by summating percent loss of life 250 over each sampling interval, i.e., $\Delta t_n$ 266, and subtracting the summation from one hundred percent, as represented in diagram 248 by an equation 268. Percent remaining life, % $RL_{THERMAL}$ 252 may subsequently be stored in transformer condition database 50 (FIG. 1).

Figure 14:
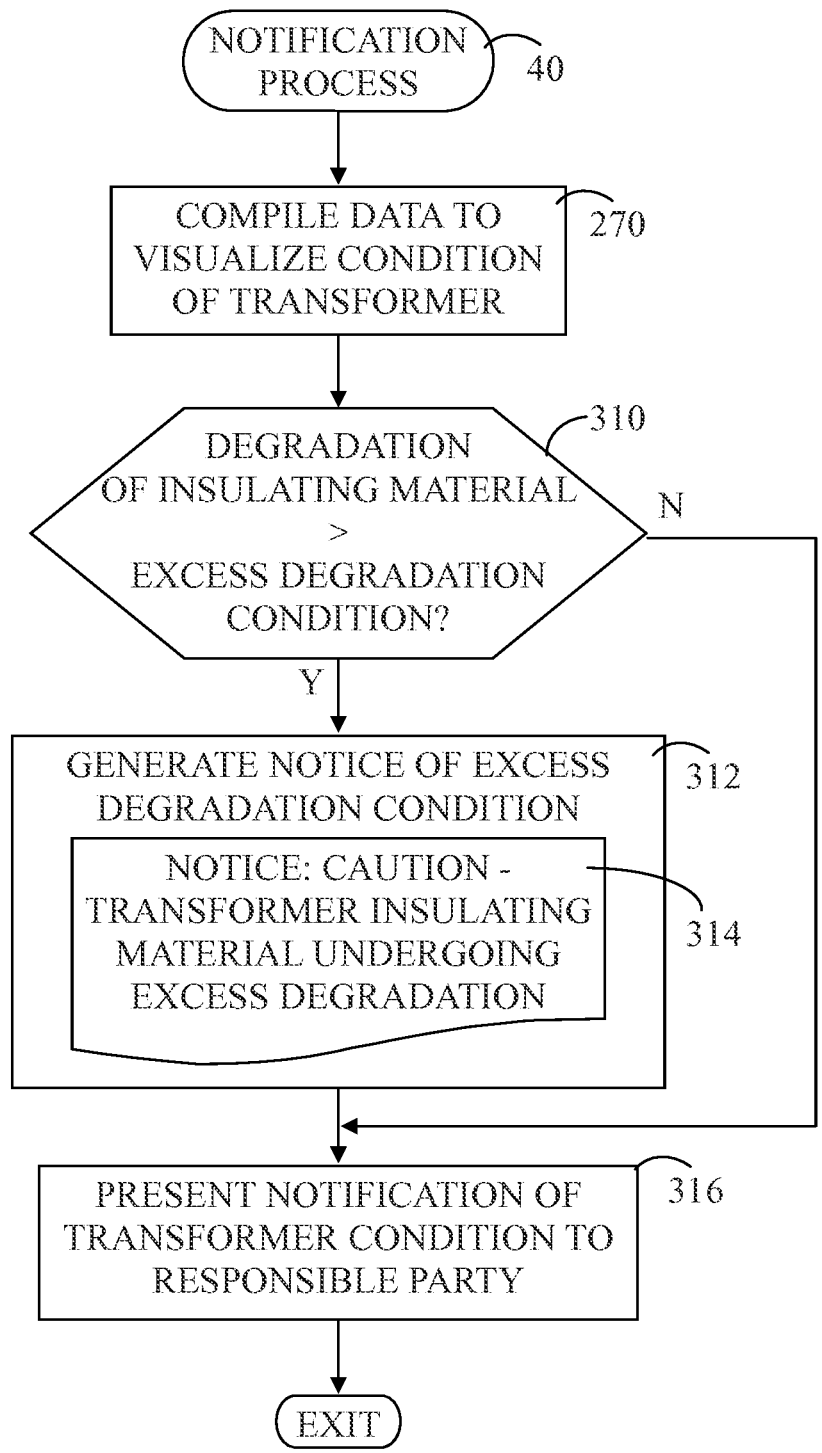
FIG. 14 shows a flowchart of a notification process.

FIG. 14 shows a flowchart of notification process 40. Notification process 40 may be performed to inform one or more responsible parties 58 (FIG. 1) of the results of analysis process 36 including, for example, degree of polymerization (DP) value 116 (FIG. 5), percent remaining life % RL 124 (FIG. 5), duration until end of life, ENDLIFE(T) 216 (FIG. 11), percent remaining life, % $RL_{THERMAL}$ 252 (FIG. 13), percent remaining life removed due to a future through-fault event, % $RL_{FLT(FUTURE)}$ 238 (FIG. 12), notification of transformer aging, and so forth. The notification process presented herein is for illustrative purposes. Those skilled in the art will understand that notification can be performed by a number of methodologies.

Notification process 40 begins with a task 270. At task 270, processor 34 (FIG. 1) accesses transformer condition database 50 (FIG. 1) and compiles the various computed measures of transformer life for presentation to one or more responsible parties 58.

Referring to FIGS. 15-16, FIG. 15 shows a diagram 272 of notice 62 of a transformer aging condition that may be presented to one or more responsible parties 58, and FIG. 16 shows a graph 276 depicting a gas generation rate 278 of dissolved gases 72 in transformer 26 (FIG. 1) relative to an age 280 of transformer 26. Notice 62, graph 276, or some combination thereof may be compiled at task 270 for presentation to responsible party(ies) 58.

Notice 62 includes transformer identifier 68 identifying one of transformers 26 (FIG. 1). The measures of transformer life presented in notice 62 include, for example, estimated degree of polymerization (DP) value 116, percent remaining life % RL 124 (computed from dissolved gases), percent remaining life, % $RL_{THERMAL}$ 252, duration until end of life, ENDLIFE(T) 216, and percent remaining life removed due to a future through-fault event, % $RL_{FLT(FUTURE)}$ 238 (FIG. 12). Notice 62 may additionally include text 282, and/or either of notices 244 and 246 (FIG. 12) in the form of wording that describes the condition of transformer 26.

Notice 62 is illustrated herein to portray the information regarding transformer life that may be presented via execution of notification process 40 (FIG. 1) to one or more of responsible parties 58 in accordance with the present invention. The particular configuration of notice 62 can take a variety of forms known to those skilled in the art, and may or may not be combined with additional information regarding transformer 26, values 70 (FIG. 2) for the various monitored dissolved gases 72 (FIG. 2), and so forth. Additionally, notice 62 need not include all of the information presented in diagram 272, but may instead include some subset thereof that would be most useful to the appropriate responsible party 58.

Graph 276 provides an additional technique for interpreting the various measures of transformer condition for one of transformers 26 identified by transformer identifier 68. In particular, graph 276 illustrates a three way relationship between an amount of total $CO+CO_2$ formed, the rate of $CO+CO_2$ formation (i.e., gas generation rate 278) determined, for example, as discussed in connection with diagram 78 (FIG. 4), and the operation time of transformer 26 (i.e., age 280). A current sample 284 is plotted on graph 276. A selectable number of previous samples 286 can also be plotted on graph 276. Accordingly, samples 284 and 286 represent a rate of degradation of the insulating material within one of transformers 26 as a function of gas generation rate 278 and an operation time (i.e. age 280) of transformer 26. Additionally, a caution limit level 288 and an abnormal limit level 290 can be provided in graph 276 to demarcate a normal range 292, a caution range 294, and an abnormal range 296 of dissolved, gas formation, relative to age 280.

Caution limit level 288 is set to 0.304 ml/g and gas generation rate of $1.156 \times 10^{-6}$ ml/g*hr. Additionally, abnormal limit level 290 is set to 1.071 ml/g and gas generation rate of $4.076 \times 10^{-6}$ ml/g*hr. In accordance with an embodiment, caution limit, level 288 corresponds to degree of polymerization (DP) value 116 (FIG. 5) of seven hundred and abnormal limit level 290 corresponds to DP value 116 of four hundred and thirty. DP values 116 for caution limit level 288 and abnormal limit level 290 can be substituted into degree of polymerization equation 112 (FIG. 5) to solve for respective $DG_{TOTAL}$ values 114 (FIG. 5), an amount of total $CO+CO_2$ formed. Using these calculated $DG_{TOTAL}$ values 114 and a transformer lifetime of thirty years yields the gas generation rates of $1.156 \times 10^{-6}$ ml/g*hr for caution limit level 288 and $4.076 \times 10^{-6}$ ml/g*hr for abnormal limit level 290. In graph 276, the straight line of caution limit level 288 shows the time (i.e., age 280) at which the caution level of 0.304 ml/g is reached for particular rates of $CO+CO_2$ formation (i.e. gas generation rate 278). Likewise, the straight line of abnormal limit level 290 shows the time (i.e., age 280) at which the abnormal level of 1.071 ml/g is reached for particular rates of $CO+CO_2$ formation (i.e. gas generation rate 278).

Graph 276 shows the progress of transformer aging through approximately the first ten years. A typical design life for a transformer is thirty years, as represented in graph 276 by a thirty year marker 298. In this instance, current sample 284 and all previous samples 286 reveal that gas generation rate 278 for transformer 26 (FIG. 1) is within normal range 292 and that transformer 26 is expected to operate for its full lifetime of thirty years. This lifetime is represented by a dotted line 300 that intersects thirty year marker 298 but stays below caution limit level 288. By way of comparison, a future sample 302 reveals an increase in gas generation rate 278 that is still be within normal range 292. However, at this gas generation rate 278, transformer 26 may not operate for its full lifetime of thirty years, as represented by a dotted line 304 that intersects caution limit level 288 prior to intersecting thirty year marker 298. Conversely, another future sample 306 may reveal a decrease in gas generation rate 278, and transformer 26 is expected to operate for its full thirty year lifetime, again represented by a dotted line 308 that intersects thirty year marker 298 but stays below caution limit level 288. Thus, graph 276 provides straightforward visualization of gas generation rate 278 of $CO+CO_2$ dissolved gases 72 that correlate with the degradation of insulating material in transformer 26, within limits 288 and 290 defined by estimated degree of polymerization (DP) values 116 (FIG. 5).

Referring back notification process 40 (FIG. 14) following the compilation of data at task 270, process 40 may continue with a query task 310. At query task 310, a determination may be made as to whether degradation of insulating material in transformer 26 is greater than an excess degradation condition. Referring briefly to the exemplary graph 276 presented in FIG. 16, an excess degradation condition may be designated by caution limit level 288. An example of an excess degradation condition of the insulating material relative to caution limit level 288 is represented by sample 302 in which gas generation rate 278 has increased enough that transformer 26 may not operate for its full lifetime of thirty years, represented by dotted line 304 intersecting caution limit level 288 prior to intersecting thirty year marker 298.

When query task 310 reveals an excess degradation condition, process 40 continues with a task 312 at which a notice 314 may be generated indicating that transformer insulating material is undergoing excess degradation. Following task 312, notification process 40 continues with a task 316. Alternatively, when transformer 26 is not undergoing excess degradation of its insulating material, notification process 40 can also continue with task 316.

At task 316, notification of the condition of transformer 26 (FIG. 1) may be presented to responsible party 58 (FIG. 1). This notification may be notice 62 (FIG. 1) having some or all or the information provided in diagram 272 (FIG. 15). Depending upon condition of transformer 26, notice 62 may include notice 314, notices 244 or 246 (FIG. 15), or any other wording deemed most suitable for communicating the needed information to responsible parties 58. This notification may additionally or alternatively include graph 276. Thus, in its entirety, notification at task 316 can provide responsible parties 58 with a high level of detail in order to make appropriate decisions regarding transformer maintenance, transformer replacement, and so forth. Following task 316, notification process 40 exits.

In summary, the present invention entails an analysis method, computer-readable medium containing executable code, and a system for assessing aging of cellulose insulating materials and estimating a remaining useful life of transformers monitored by monitoring units. Analysis in accordance with the present invention provides an indirect estimate of the degree of polymerization (DP) of insulating material in a transformer by analyzing an amount of dissolved gases, and particularly carbon monoxide (CO) and carbon dioxide ($CO_2$), in the transformer oil as monitored by the DGA units. This estimate of DP can be used to estimate a measure of the remaining useful life of a transformer based upon dissolved gas values received from the DGA units. Results from the analysis can be utilized to determine a transducer aging condition, to determine an ability of a transducer to survive a through-fault, to determine when a transducer may need to be serviced or otherwise replaced, and so forth.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for estimating a remaining life of a transformer, said transformer being monitored by a monitoring device, and said method comprising:
    receiving data elements collected at said monitoring device that characterize a degradation of insulating material in said transformer during operation of said transformer over a period of time, said data elements being received at a processing system from said monitoring device, and said data elements representing a current value of dissolved gases in said transformer that correlate with said degradation of said insulating material in said transformer;
    determining an adjustment value for said dissolved gases in response to an isolated event occurring at said transformer;
    combining said current value of said dissolved gases with said adjustment value to obtain a total value of said dissolved gases;
    estimating a degree of polymerization value using said total value of said dissolved gases;
    converting said degree of polymerization value into a measure of said remaining life; and presenting said measure of said remaining life to a user, wherein said determining, combining, estimating, converting, and presenting operations are performed by said processing system.

2. A method as claimed in claim 1 wherein said dissolved gases include carbon monoxide (CO) and carbon dioxide ($CO_2$) in transformer oil of said transformer, said carbon monoxide and said carbon dioxide evolving in said transformer oil from said degradation of said insulating material, and said method further comprises calculating said current value of said dissolved gases in response to a weight of said insulating material and a volume of said transformer oil in said transformer.

3. A method as claimed in claim 1 wherein:
said determining operation comprises identifying said isolated event as a maintenance event in which said dissolved gases are removed from transformer oil in said transformer during said maintenance event, and tracking an amount of said dissolved gases removed from said transformer oil during said maintenance event, said amount corresponding to said adjustment value; and
said combining operation includes summing said current value and said adjustment value to obtain said total value of said dissolved gases.

4. A method as claimed in claim 1 wherein:
said determining operation comprises identifying said isolated event as a through-fault event which results in a reduction of said degree of polymerization, calculating an equivalent amount of said dissolved gases for said transformer, said equivalent amount representing said reduction of said degree of polymerization due to said through-fault event, and tracking said equivalent amount calculated for said through-fault event, said equivalent amount corresponding to said adjustment value; and
said combining operation includes summing said current value and said adjustment value to obtain said total value of said dissolved gases.

5. A method as claimed in claim 1 further comprising:
converting said measure of remaining life into a predicted duration until end of life of said transformer; and
presenting said predicted duration until end of life to said user.

6. A method as claimed in claim 5 wherein said converting comprises:
calculating a future value of said dissolved gases to reach a minimum allowable of polymerization value relative to said total value of said dissolved gases;
determining a gas generation rate for each of said dissolved gases; and
utilizing said future value and said gas generation rate for said each of said dissolved gases to ascertain said predicted duration until end of life of said transformer.

7. A method as claimed in claim 1 further comprising:
predicting, in response to said measure of remaining life, that said transformer is unlikely to withstand a future through-fault event; and
communicating a notice to said user that said transformer is unlikely to withstand said future through-fault event.

8. A method as claimed in claim 7 wherein said predicting operation comprises:
estimating a second measure of a remaining life removed due to said future through-fault event;
comparing said second measure of remaining life removed due to said future through-fault event with said measure of said remaining life; and
ascertaining that said transformer is unlikely to withstand said future through-fault event when said measure is less than said second measure.

9. A method as claimed in claim 1 wherein said measure of said remaining life is a first measure of said remaining life, and said method further comprises:
periodically receiving a winding temperature of said transformer;
computing an effective aging factor of transformer insulation in response to said winding temperature;
determining a second measure of said remaining life in response to said effective aging factor of said transformer insulation; and
correlating said first and second measures of said remaining life.

10. A method as claimed in claim 1 further comprising:
determining, from said data elements, a gas generation rate for said dissolved gases; and
ascertaining a rate of degradation of said insulating material as a function of said gas generation rate and an operation time of said transformer.

11. A method as claimed in claim 10 further comprising:
determining that said rate of degradation of said insulating material is an excess degradation rate condition; and
conveying a notice of said excess degradation rate condition to said user.

12. A non-transitory computer-readable storage medium containing executable code for instructing a processor to estimate a remaining life of a transformer maintained by an organization and monitored by a dissolved gas monitoring device, said executable code instructing said processor to perform operations comprising:
receiving data elements collected at said monitoring device that characterize a degradation of insulating material in said transformer during operation of said transformer over a period of time, said data elements being received at a processing system from said monitoring device, and said data elements representing a current value of dissolved gases in said transformer that correlate with said degradation of said insulating material in said transformer;
identifying at least one of a maintenance event and a through-fault event, wherein said maintenance event results in a removal of said dissolved gases from transformer oil in said transformer and said through-fault event results in a reduction of said degree of polymerization for said transformer;
storing an adjustment value representing at least one of an amount of said dissolved gases removed from said transformer oil during said maintenance event and an equivalent amount of said dissolved gases calculated for said transformer due to said through-fault event, said equivalent amount representing said reduction of said degree of polymerization;
combining said current value of said dissolved gases with said adjustment value to obtain a total value of said dissolved gases;
estimating a degree of polymerization value using said total value of said dissolved gases;
converting said degree of polymerization value into a measure of said remaining life; and
presenting said measure of said remaining life to a user.

13. A non-transitory computer-readable storage medium as claimed in claim 12 wherein said executable code instructs said processor to perform further operations comprising:
converting said measure of remaining life into a predicted duration until end of life of said transformer; and presenting said predicted duration until end of life to said user.

14. A non-transitory computer-readable storage medium as claimed in claim 12 wherein said executable code instructs said processor to perform further operations comprising:
predicting, in response to said measure of remaining life, that said transformer is unlikely to withstand a future through-fault event; and
communicating a notice to said user that said transformer is unlikely to withstand said future through-fault event.

15. A non-transitory computer-readable storage medium as claimed in claim 14 wherein said executable code instructs said processor to perform operations of said predicting operation comprising:
estimating a second measure of a remaining life removed due to said future through-fault event;
comparing said second measure of remaining life removed due to said future through-fault event with said measure of said remaining life; and
ascertaining that said transformer is unlikely to withstand said future through-fault event when said measure is less than said second measure.

16. A computing system for estimating a remaining life of a transformer monitored by a monitoring device comprising:
a processor;
an input element, in communication with said processor, for receiving data elements from said monitoring device, said data elements being associated with operation of said transformer during a period of time;
a computer-readable storage medium; and
executable code recorded on said computer-readable storage medium for instructing said processor to perform operations comprising:
receiving said data elements collected at said monitoring device that characterize a degradation of insulating material in said transformer during operation of said transformer over a period of time, said data elements being received at a processing system from said monitoring device, and said data elements representing a current value of dissolved gases in said transformer that correlate with said degradation of said insulating material in said transformer, said dissolved gases including carbon monoxide (CO) and carbon dioxide ($CO_2$) in transformer oil of said transformer, said carbon monoxide and said carbon dioxide evolving in said transformer oil from said degradation of said insulating material;
calculating said current value of said dissolved gases in response to a weight of said insulating material and a volume of said transformer oil in said transformer;
determining an adjustment value for said dissolved gases in response to an isolated event occurring at said transformer;
combining said current value of said dissolved gases with said adjustment value to obtain a total value of said dissolved gases;
estimating a degree of polymerization value using said total value of said dissolved gases;
converting said degree of polymerization value into a measure of said remaining life;
converting said measure of remaining life into a predicted duration until end of life of said transformer; and
presenting said measure of said remaining life and said predicted duration until end of life to a user.

17. A computing system as claimed in claim 16 wherein said executable code instructs said processor to perform further operations comprising:
identifying said isolated event as a maintenance event in which said dissolved gases are removed from transformer oil in said transformer during said maintenance event;
tracking an amount of said dissolved gases removed from said transformer oil during said maintenance event, said amount corresponding to said adjustment value; and
summing said current value and said adjustment value to obtain said total value of said dissolved gases.

18. A computing system as claimed in claim 16 wherein said executable code instructs said processor to perform further operations comprising:
identifying said isolated event as a through-fault event which results in a reduction of said degree of polymerization;
calculating an equivalent amount of said dissolved gases for said transformer, said equivalent amount representing said reduction of said degree of polymerization due to said through-fault event;
tracking said equivalent amount calculated for said through-fault event, said equivalent amount corresponding to said adjustment value; and
summing said current value and said adjustment value to obtain said total value of said dissolved gases.

19. A computing system as claimed in claim 16 wherein said executable code instructs said processor to perform further operations comprising:
calculating a future value of said dissolved gases to reach a minimum allowable degree of polymerization value relative to said total value of said dissolved gases;
determining a gas generation rate for each of said dissolved gases; and
utilizing said future value and said gas generation rate for said each of said dissolved gases to ascertain said predicted duration until end of life of said transformer.

20. A computing system as claimed in claim 16 wherein said executable code instructs said processor to perform further operations comprising:
determining, from said data elements, a gas generation rate for said dissolved gases; and
ascertaining a rate of degradation of said insulating material as a function of said gas generation rate and an operation time of said transformer.

* * * * *